May 1, 1962 J. D. ROBINSON 3,032,090
ANTISKID CHAIN APPLIANCE
Filed June 26, 1961 2 Sheets-Sheet 1
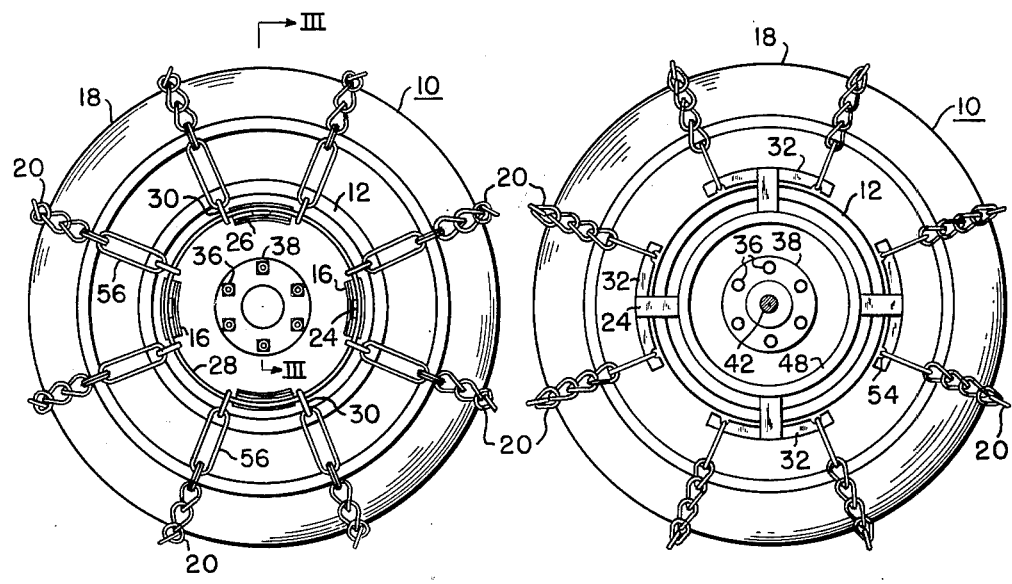
Fig. 1
Fig. 2
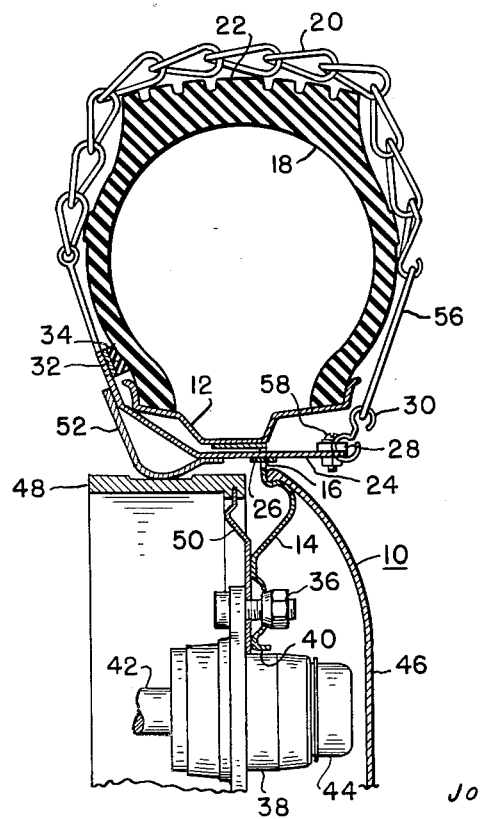
Fig. 3
INVENTOR.
Joseph D. Robinson
BY Webb, Mackey & Burden
HIS ATTORNEYS May 1, 1962   J. D. ROBINSON   3,032,090
ANTISKID CHAIN APPLIANCE
Filed June 26, 1961   2 Sheets-Sheet 2

INVENTOR.
Joseph D. Robinson
BY
Webb, Mackey & Burden
HIS ATTORNEYS

3,032,090
ANTISKID CHAIN APPLIANCE
Joseph D. Robinson, 5100 Hillcrest St., Bloomfield, Pa., assignor of one-half to John A. Robinson, Pittsburgh, Pa.
Filed June 26, 1961, Ser. No. 119,641
5 Claims. (Cl. 152—237)

The present application relates to automotive antiskid chains and, more particularly, to a chain-mounting appliance for attachment of the chains to automobile wheels. The appliance according to this invention comprises means mounted on opposite inner and outer sides of the vehicle wheel whereby pairs of cross-chain sections may be attached and detached readily.

The conventional automobile disk wheel includes the central disk or web, a rim for mounting a tire and affixed to the outer margin of the disk, and a pneumatic tire on the rim. In full assembly, it will further include a brake drum secured to the inner side of the disk by bolts, and a hub cap or cover secured to the outer side of the disk usually with a snap fit.

Road chains of the type ordinarily applied are secured only to the tire itself and are a source of difficulty to install and remove. Mounting devices have been proposed, but, in many cases, cannot be left on the wheel without leaving the chains installed, too; in other cases, where the devices used are of the type designed to be left alone on the wheel, they frequently are noisy with a tendency to be dislocated and they sometimes come off inadvertently.

The appliance according to this invention comprises an antirattle ring disposed on the outer side of the wheel in a confronting relation to the wheel strap openings and surrounding the hub cap of the wheel, and a plurality of wheel brackets each with an intermediate anchoring portion disposed within a wheel strap opening, an outer end of reduced size secured to the ring, and an inner end, i.e., an end projecting toward the inner side of the wheel and outwardly, and presenting an enlarged end formed of a cross bar having chain engaging portions at its opposite ends. Pairs of chain sections are provided each secured at one extremity to the cross bar and extending in a transverse disposition across the tread of the tire. The opposite extremity of each chain section is secured under tensile preload to the ring by means of elastic loops of elastomeric material such as synthetic or plastics or natural rubber.

An added bar or strap which I provide securely on each bracket produces an offset portion adjacent the inner end so that, as the brake drum engages same, the drum acts as a perch keeping the unsupported inner end of the brackets from rattling. My bracket is self-supporting. It is preferably steel with an anti-rust coating thereon and can remain on an automobile wheel throughout all of the winter months; there is at no time a complication attached to letting the appliance remain secured to the wheel during normal operation of the automobile without chain sections.

Further features, objects and advantages will either be specifically pointed out or become apparent when, for a better understanding of the invention, reference is made to the following description taken in conjunction with the accompanying drawings which form a part hereof and in which:

FIGURE 1 is an outer or curbside view of a conventional wheel to which an appliance embodying the present invention is shown applied;

FIGURE 2 is a side view of the inside of the wheel;

FIGURE 3 is an enlarged sectional view taken on the lines III—III of FIGURE 1;

Figure 4:
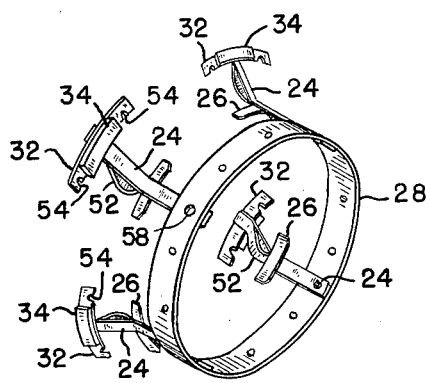
FIGURE 4 is a perspective view of the appliance, but from which the wheel and chains are omitted.
Figure 5:
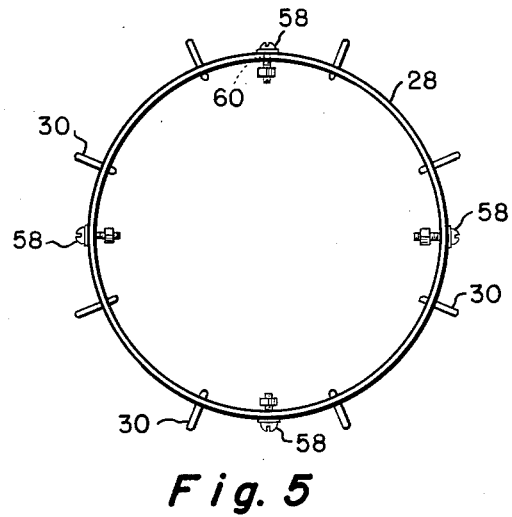
FIGURES 5 and 6, show the anchoring ring of the appliance as viewed from the face and from the side.

More particularly in the drawings, an automobile wheel 10 of conventional construction is showing including a drop center rim 12, a central disk 14 with the outer margin secured to the rim 12 at interrupted points to define circumferentially extending wheel strap openings 16, and a pneumatic tire 18 mounted to the rim. An inner tube is not shown; in fact in many tires, a separate tube is omitted anyway.

The cross-chain sections 20 consist of standard short lengths of antiskid chain provided with the usual hooks and secured in transverse disposition across the tread 22 of the tire 18. The improved mounting appliance for attaching these chains to the automobile wheel 10 is as follows.

Figure 6:
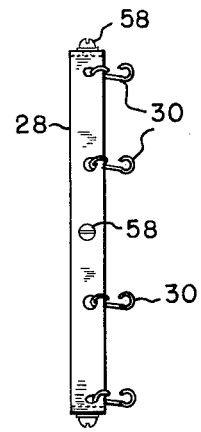
Figure 7:
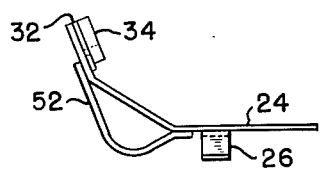
FIGURES 7 and 8 show an individual attachment bracket as viewed from the side and from the top.
Figure 8:
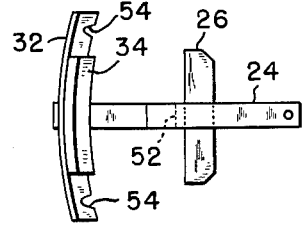

A plurality of main attaching brackets of double T shape (FIGURE 8) is arranged so that an intermediate portion 24 of each bracket passes through one strap opening 16 of the wheel. The portion 24 carries a fixed cross bar 26 which curves on an arc of a circle so as to fit snugly within the strap opening and to squarely abut at its opposite ends with the adjacent spoke portions of the wheel disk 14. The bar 24 has a narrow outer end which extends to the outer or curbing side of the wheel and is bolted to a ring 28. The ring 28 keeps the unsupported outer ends of the brackets from rattling and is provided with a series of individual hooks 30 carried at spaced-apart points therealong (see FIGURE 6).

The inner end of each bracket carries a large fixed cross bar 32 which is curved on the arc of a circle so as to conform to a substantially radially extending plane with which the cross bars 26 are in a generally transverse relationship. A fairly thin nonmetallic pad 34 such as rubber or plastic is bonded to the underside face of the cross bar 32 so as to prevent the metal from chafing against the rubber side wall of the confronting tire 18.

The wheel 10 is secured by bolts 36 to a hub 38 received within the hub opening 40 of the wheel. A drive axle 42 rotates the hub 38 under torque and the end of the axle is enclosed by means of a frictionally-held cover 44 carried by the hub 38.

At its outer face, the wheel 10 carries a snap-fitting hub cap 46 which is within and radially spaced apart from the ring 28. A brake drum 48 has a web 50 by means of which it is secured to the hub 38 so as to be in contact with the inner face of the wheel 10. A bar 52 bent between its end portions is secured to each bracket so as to provide an offset and it rests against the brake drum 48 for support and to prevent rattling of the brackets.

The cross bars 32 are notched at opposite ends to provide chain points of attachment 54; the chain sections 20 are connected at one end in equalizing way to the cross bars at these points of attachment and the inner end of the bracket is so arranged as to be equidistant between the chain sections of each pair. Elastic loops 56 of round cross section or band section secure the chain sections 20 at the other end under tensile preload to the hooks 30 on the ring 28 and thus the ring keeps the chain sections from rattling.

In installation, the brackets are passed through the openings from the inner side to the outer side of the wheel 10 so that the cross bar 26 of each will lodge in the associated strap opening 16. The narrow outer end is then secured by a fastener 58 such as a screw and nut to the ring 28 which is provided with screw holes 60 for this purpose. At this point, the wheel, the brake drum, and the tire 18 are directly engaged by the bracket and, as can be seen from FIGURE 4, the ring 28 completes the assembly so that, when mounted to the tire, this assembly has a solid snugly fitting position in which it can remain attached to the wheel without shifting during normal operation of the automobile.

When the road surfaces are such that the vehicle needs antiskid chains, the sections 20 are applied to the appliance one at a time and one chain section will illustrate the mode of appliance for the others. At one end, it is hooked to the point of attachment 54 of the cross bars 32 and then brought across the tread 22 of the tire 18 to a point spaced apart from the ring 28. The short elastic loop or band 56 is then engaged in a hook 30 on the ring 28 and stretched until it is hooked by the adjacent end of the chain section 20.

The operation is then repeated to complete a pair of chain sections. As many further pairs of chain sections are applied as desired, the installer being careful for purposes of balance to see that, for each pair of chain sections installed, an opposite pair is also applied to the wheel 10.

As herein disclosed, the invention is shown embodied in an appliance for one of the standard automotive wheels having four equidistantly spaced strap openings in the disk; it is evident that the number of brackets provided will correspond with the number of strap openings of the individual wheel. It is further evident that the ring 28 will be drilled with screw holes 60 and provided with hooks 30 and hook holes of numbers and spacing corresponding to the strap openings. So also, the drawings show the chain sections positively hooked at opposite ends so as to be held firmly in place due to tension; self-evidently, when any chain section 20 parts due to wear in the intermediate portion between its oppositely hooked ends, the hook portions will independently become disengaged as the wheel rotates and thus, in most cases, there will be no attendant slap in the wheel house of a vehicle until such time as the vehicle may be stopped and the broken chains unhooked; in other words, the present chain sections have a self-removing action when they fail and lose their tension and a vehicle as it proceeds may tend to shake off the opposite ends of each parted chain section.

Normal removal of the chains is accomplished by stretching each loop 56 until it unhooks from the chain whereupon the chain section can be removed by unhooking it at the opposite end from the associated cross bar 32. Removal of the entire appliance is accomplished by unbolting the fasteners 58, detaching the ring 28, and, from the inner side of the wheel, withdrawing each bracket from the strap opening 16 in which it is lodged.

Variations within the spirit and scope of the invention described are equally comprehended by the foregoing description.

I claim:

1. Tire chain mounting appliance for attachment of the chains to an automotive wheel having a disk, having a rim secured thereto on which the tire is mounted, and having strap openings, said strap openings being circumferentially spaced apart in the outer marginal portion of the disk adjacent said rim, said appliance being adapted for remaining attached to said wheel when not mounting tire chains and comprising in combination, an antirattle ring disposed in confronting relation to the strap openings adjacent the rim, a plurality of anchoring brackets each secured at the outer end to the ring and having a portion intermediate the ends of each bracket received in a strap opening, a cross bar on each of said brackets and each secured to the intermediate portion of the bracket in said opening, the major portion of the circumferential length of which opening being occupied by said bar, a chain-engaging cross bar on the inner end of each said bracket, said chain-engaging cross bar having spaced apart chain-engaging portions disposed therealong, said antirattle ring having spaced apart portions therearound for attachment to chains.

2. An appliance for use in mounting tire chain sections to an automobile wheel, said wheel including a pneumatic tire, a disk having a strap openings in the outer margin thereof, a rim on which the tire is mounted and which is secured to the outer margin of the disk, and a hub cap and a brake drum disposed on the outer and inner sides of the disk respectively in secured relation thereto, said appliance comprising the combination of an antirattle ring surrounding the hub cap in spaced-apart relation thereto and in confronting relation to the strap openings adjacent the rim, a plurality of double T-shaped brackets secured at the outer end to the ring and having a portion intermediate the ends of each bracket received in a strap opening, first cross bars on said brackets each secured to the intermediate portion of a bracket in said opening, the major portion of the circumferential length of which opening being occupied by said first bar, a second cross bar on the inner end of each bracket and having chain-engaging portions at the opposite ends of the cross bar to which plural chain sections are secured at one end in an equalizing way, antichafing cushions on said second cross bars each secured to the underside face of the bar, said cushions being of non-metallic material preventing metal-to-rubber contact from occurring between the second cross bars and the confronting portion of the tire, and an antirattle bar bent between its ends and secured to each bracket so as to provide an offset for perching against a confronting portion of said brake drum.

3. An appliance for use in mounting tire chain sections to an automobile wheel, said wheel including a pneumatic tire, a disk having strap openings in the outer margin thereof, a rim on which the tire is mounted and which is secured to the outer margin of the disk, and a hub cap and a brake drum disposed on the outer and inner sides of the disk respectively in secured relation thereto, said appliance comprising the improved combination of an antirattle ring surrounding the hub cap in spaced-apart relation thereto and in confronting relation to the strap openings adjacent the rim, a plurality of double T-shaped brackets secured at the outer end to the ring and having a portion intermediate the ends of each bracket received in a strap opening, first cross bars on said brackets each secured to the intermediate portion of a bracket in said opening, the major portion of the circumferential length of which opening being occupied by said first bar, a second cross bar on the inner end of each bracket and having chain-engaging portions at the opposite ends of the cross bar to which plural chain sections are secured at one end in an equalizing way, the first and second cross bars of the individual brackets each being curved on an arc of a circle and with the second cross bars conforming to a substantially radially extending plane with which the first cross bars are in a generally transverse relationship, and anti-chafing cushions carried by the brackets each secured to the underside face of the second cross bar thereof and made of nonmetallic material preventing metal-to-rubber contact from occurring between the second cross bars and the confronting portion of the pneumatic tire.

4. The appliance of claim 1 characterized by said chain-engaging cross bar having an antichafing cushion of nonmetallic material secured to its underside face for engagement against a confronting portion of said tire.

5. The appliance of claim 1 characterized by elastic tension members attached to said spaced apart portions of said antirattle ring and by cross chain sections having hooks at each end for connection to said chain-engaging portions of said chain-engaging cross bar and to said elastic tension members so that in event a part of said cross chain section fails, the remainder thereof is independently disengageable from said wheel during rotation thereof.

References Cited in the file of this patent

UNITED STATES PATENTS

| | | |
|---|---|---|
| 1,199,698 | Heinsius | Sept. 26, 1916 |
| 1,486,716 | Wood | Mar. 11, 1924 |
| 2,417,752 | Hayes | Mar. 18, 1947 |
| 2,733,748 | Cranston | Feb. 7, 1956 |